United States Patent
Dunsmore et al.

(10) Patent No.: US 11,121,784 B2
(45) Date of Patent: Sep. 14, 2021

(54) METHOD AND DEVICE FOR DETECTING POWER OF A PERIODIC SIGNAL IN A BAND OF INTEREST

(71) Applicant: Keysight Technologies, Inc., Santa Rosa, CA (US)

(72) Inventors: Joel P. Dunsmore, Sebastopol, CA (US); Jean-Pierre Teyssier, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 831 days.

(21) Appl. No.: 15/592,961

(22) Filed: May 11, 2017

(65) Prior Publication Data
US 2018/0331770 A1 Nov. 15, 2018

(51) Int. Cl.
*H04W 24/08* (2009.01)
*H04B 17/318* (2015.01)

(52) U.S. Cl.
CPC .......... *H04B 17/318* (2015.01); *H04W 24/08* (2013.01)

(58) Field of Classification Search
None
See application file for complete search history.

(56) References Cited

U.S. PATENT DOCUMENTS

| | | | |
|---|---|---|---|
| 6,329,905 B1 * | 12/2001 | Cunningham | H04B 3/54 340/855.3 |
| 6,377,552 B1 | 4/2002 | Moran, III et al. | |
| 7,386,070 B2 | 6/2008 | Zhang | |
| 7,400,129 B1 * | 7/2008 | Prather | G01R 23/20 324/76.19 |
| 7,592,795 B2 | 9/2009 | Prather | |
| 2003/0098682 A1 * | 5/2003 | Jin | G01R 23/16 324/76.21 |
| 2010/0313094 A1 * | 12/2010 | Kubota | H04L 27/3863 714/746 |
| 2015/0100258 A1 * | 4/2015 | Morii | G10L 25/21 702/61 |
| 2016/0042734 A1 * | 2/2016 | Cetinturk | G10L 15/063 704/236 |
| 2017/0070966 A1 * | 3/2017 | Ganesan | H04W 52/52 |

OTHER PUBLICATIONS

Cheng Huang et al., "On the Use of Multi-Tone for the Measurement of Noise Power Ratio Distortion in RF Circuits," APCCAS 2008—2008 IEEE Asia Pacific Conference on Circuits and Systems, 2008, pp. 1596-1599.

(Continued)

*Primary Examiner* — Ajit Patel
*Assistant Examiner* — Pamit Kaur (57) ABSTRACT

A method is provided for detecting power of a periodic signal in a band of interest of the periodic signal having a predetermined bandwidth. The method includes determining frequencies of multiple tones in the periodic signal, respectively; receiving the periodic signal at a signal analyzer; selectively measuring power values at the frequencies of the multiple tones; and determining a band power of the periodic signal over the predetermined bandwidth by summing the power values at the frequencies of the multiple tones.

20 Claims, 5 Drawing Sheets

(56) References Cited

OTHER PUBLICATIONS

Huang Cheng et al., "On the Use of Multi-Tone for the Estimation and Measurement of Noise Power Ratio in Third-Order Nonlinear System," Chinese Journal of Electronics, vol. 19, No. 4, Oct. 2010, pp. 763-768.

Soumendu Bhattacharya et al., "Test Time Reduction for ACPR Measurement of Wireless Transceivers Using Periodic Bit-Stream Sequences," Proceedings of the Second IEEE International Workshop on Electronic Design, Test and Applications (DELTA'04), 2004, pp. 1-6.

\* cited by examiner

METHOD AND DEVICE FOR DETECTING POWER OF A PERIODIC SIGNAL IN A BAND OF INTEREST

BACKGROUND

A variety of systems and techniques are employed to determine various characteristics of a device under test (DUT), such as amplifiers used in communications systems, by measuring modulated output signals in response to corresponding input signals. For example, wide-band modulated measurements may be made using modulated output signals from an amplifier, which typically includes determining the linearity of the amplifier. Linearity is a measure of how much distortion of the input signal the amplifier creates in the output signal. One consequence of non-linear behavior is that a complex modulated signal, comprised of many signals within a specified bandwidth, may have cross-modulation or intermodulation caused by the non-linear response of the amplifier (or other active DUTs). The non-linear intermodulation products may appear as signals at new frequencies outside the desired channel bandwidth.

A common measure of intermodulation effect is two-tone intermodulation distortion (IMD). In this case, two tones at different respective frequencies are applied to the input of the amplifier (or other non-linear device). The non-linear characteristics of the amplifier cause the two tones to intermodulate with one another, resulting in an output of tones at the two original tone frequencies, as well as new tones created the original tone frequencies plus or minus the two-tone spacing. This is referred to as a third order product, and the measure of the third order product is referred to as third order IMD. The new tones, which are third order products created by the intermodulation of the two input tones, are smaller (lower amplitude) than the two input tones. With respect to a two-tone input signal, the figure of merit is typically the absolute power of the output intermodulation tone, or the relative power of the output intermodulation tone to the output main power tone.

Measuring complex modulated signals (or complex waveforms) is more difficult since a complex modulated signal may have effectively a dense spectrum of tones at different frequencies in the input signal, as opposed to just two tones. While the complex modulated signal may be random, in test scenarios used in manufacturing, the complex modulated signal may be created using an arbitrary waveform generator (AWG) by repetitively playing back a waveform that represents a time-capture of the desired communications signal.

Figure 1:
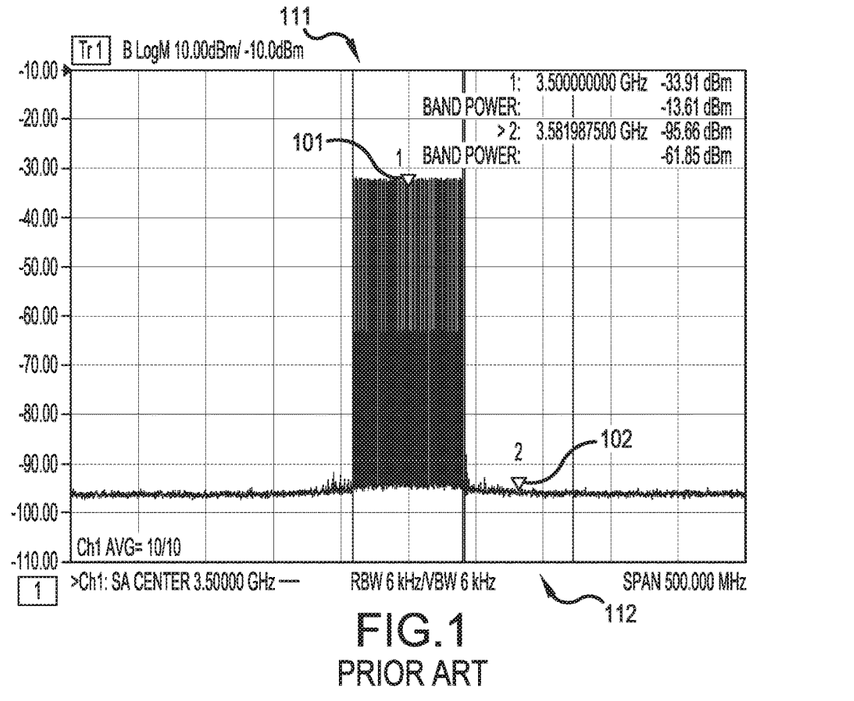
FIG. 1 is a screen shot of a display of a signal analyzer showing an illustrative spectrum of a complex modulated signal, as measured conventionally on the signal analyzer display.

FIG. 1 is a screen shot of a display of a signal analyzer, such as a N9041B UXA Signal Analyzer, available from Keysight Technologies, Inc., for example, showing an illustrative spectrum of a complex modulated signal, as measured on the signal analyzer display. The complex modulated signal is provided by a signal source (e.g., the AWG), which may be used as a stimulus signal for analyzing a DUT, as mentioned above. FIG. 1 shows first marker 101 and second marker 102 set in a special mode, called "band power" mode, that measures integrated or accumulated power over a band of interest 111 (i.e., carrier band) having a specified or predetermined bandwidth. The first marker 101 is set to measure a power value of a representative tone in the band of interest 111, and the second marker 102 is set to measure a power value of a representative tone in the upper adjacent band (high frequency side) 112 adjacent to the band of interest 111. The band power of the band of interest 111 is the sum (accumulation) of the power values of all frequencies (including the tone indicated by the first marker 101) in the band of interest 111. The adjacent band power of the adjacent band 112, which may be referred to as Adjacent Channel Power Level (ACPL), is the sum (accumulation) of the power values of all frequencies (including the tone indicated by the second marker 102) in the adjacent band 112. The ratio of the band power and the ACPL is referred to as Adjacent Channel Power Ratio (ACPR). Referring to FIG. 1, the power value indicated by the first marker 101 is about −33.91 dBm, the band power of the band of interest 111 is about −13.61 dBm, the power value indicated by the second marker 102 is about −95.66 dBm, and the ACPL of the adjacent band 112 is about −61.85 dBm. Thus, the ACPR, based on the upper ACPL, is about −48.24 dBc.

Figure 2:
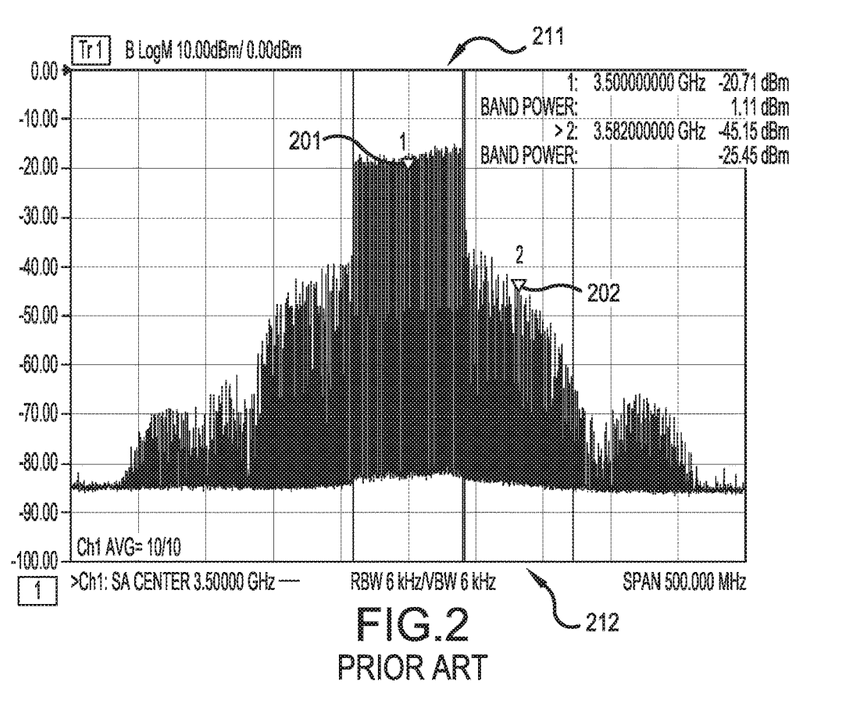
FIG. 2 is a screen shot of a display of a signal analyzer showing an illustrative spectrum of a complex modulated signal output by a DUT in response to an input complex modulated signal, as measured conventionally on the signal analyzer display.

A DUT, such as an amplifier, can be added to receive the signal from the signal source to determine how the DUT affects the linearity and/or ACPR of the signal. FIG. 2 is a screen shot of a display of a signal analyzer showing an illustrative spectrum of a complex modulated signal output by the DUT (e.g., a power amplifier with −5 dBm drive) in response to the input complex modulated signal shown in FIG. 1. The first marker 201 is set to measure a power value of a representative tone in the band of interest 211, and the second marker 202 is set to measure a power value of a representative tone in the upper adjacent band 212. Referring to FIG. 2, the power value indicated by the first marker 201 is about −20.71 dBm, the band power of the band of interest 211 is about 1.11 dBm, the power value indicated by the second marker 202 is about −45.15 dBm, and the ACPL of the adjacent band 212 is about −25.45 dBm. Thus, the ACPR, based on the upper ACPL, is about −26.55 dBc. The shape of the ACPR signal as shown in FIG. 2 is commonly seen. This is caused by classic third-order distortion in the amplifier. Generally, the ACPL is expected to drop about 3 dB for each 1 dB drop in the band power driving the amplifier, and the ACPR is expected to drop about 2 dB for each 1 dB the band power drops.

Figure 3:
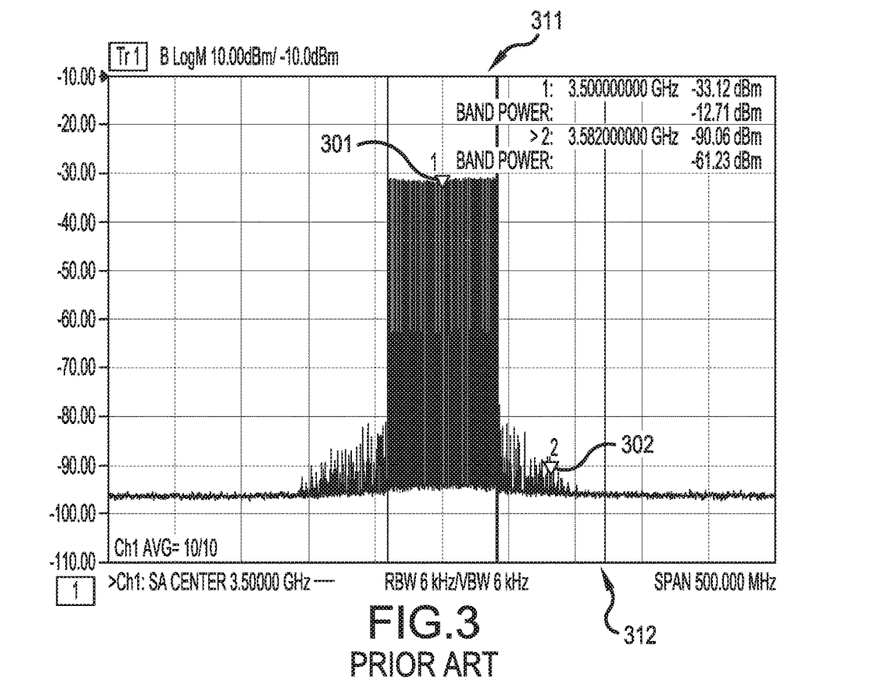
FIG. 3 is a screen shot of a display of a signal analyzer showing an illustrative spectrum of a complex modulated signal output by a DUT in response to an input complex modulated signal, as measured conventionally on the signal analyzer display.

Similarly, FIG. 3 is a screen shot of a display of a signal analyzer showing an illustrative spectrum of a complex modulated signal output by the DUT (e.g., a power amplifier with −20 dBm drive) in response to the input complex modulated signal shown in FIG. 1. Referring to FIG. 3, the power value indicated by the first marker 301 is about −33.12 dBm, the band power of the band of interest 311 is about −12.71 dBm, the power value indicated by the second marker 302 is about −92.06 dBm, and the ACPL of the adjacent band 312 is about −61.23 dBm. Thus, the ACPR, based on the upper ACPL, is about −48.52 dBc, which is about the same as the ACPR for a power amplifier with −15 dBm drive (not shown).

As compared to the −5 dBm drive of FIG. 2, the lower drive power is helpful to the extent it lowers the ACPL from about −25.45 dBm in FIG. 2 to about 61.23 dBm in FIG. 3, and also lowers the noise floor, e.g., from about −85.00 dBm in FIG. 2 to about −96.00 dBm in FIG. 3. However, as compared to a power amplifier with −15 dBm drive (not shown), the change of in the ACPL is only about 5 dBm, the change in ACPR is less than about 1 dBc, and the noise floor remains the same. So, the capability to measure ACPL and ACPR effectively bottoms out around the −20 dBm drive power amplifier using conventional measurement techniques. Yet, it is desirable to perform low-level linearization measurements of amplifiers down to −70 dBc ACPL or lower, but instrumentation limitations of both source and receiver noise floor limit the ability to measure the ACPL.

A conventional method for improving measurement of ACPL values at low levels is to improve directly the spectrum analyzer receiver noise figure, for example, by using a lower noise preamplifier. However, the addition of the pre-amplifier actually worsens the ACPL value itself, requiring additional attenuation. Creating a preamplifier with better linearity would useful, but such preamplifier is not currently possible given the state-of-the-art in amplifier design. Thus, it would be desired to have a method to measure ACPL and ACPR values at lower levels on amplifiers and other non-linear devices (such as mixers or frequency converters) utilizing existing signal analyzers.

Figure 4:
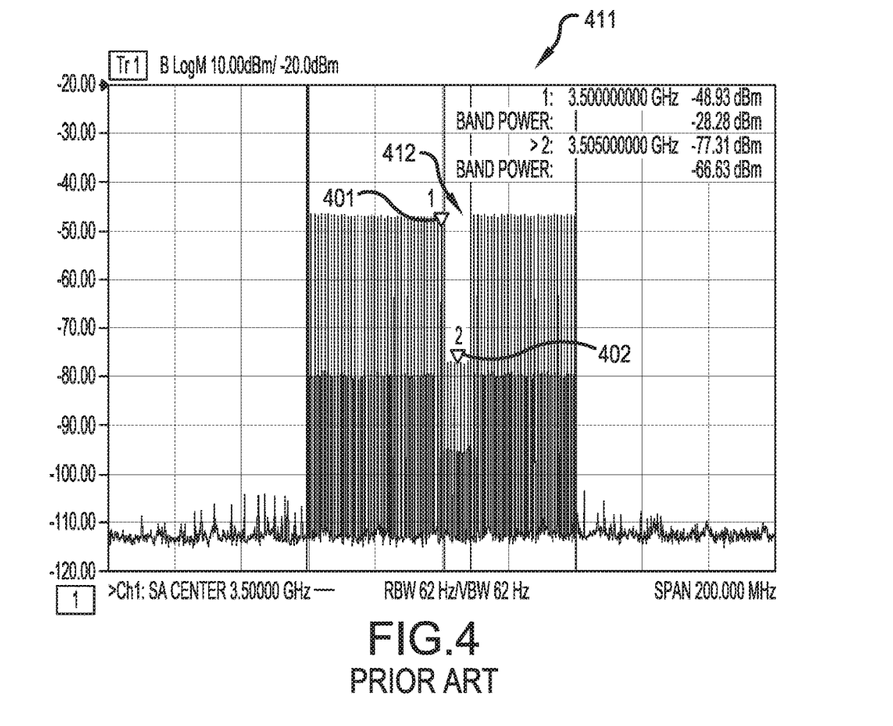
FIG. 4 is a screen shot of a display of a signal analyzer showing an illustrative spectrum of a complex modulated signal, with a notch in the band of interest, output by a DUT in response to an input complex modulated signal, as measured conventionally on the signal analyzer display.

A related measurement is Noise Power Ratio (NPR) measurement, which is typically used in satellite and other space-based applications. An NPR measurement includes creating a wideband modulated signal, typically from a noise source, and filtering the center of the signal to create a notch in the spectrum (i.e., the band of interest). However, this method of generation has been effectively abandoned in favor of using an AWG with a programmed NPR signal. The most common method, for example, is to create a dense multitone signal with constant amplitude and random phase between the tones. FIG. 4 shows a representative NPR spectrum. That is, FIG. 4 is a screen shot of a display of a signal analyzer showing an NPR spectrum output by the DUT in response to an input complex modulated signal having a notch.

Referring to FIG. 4, the first marker 401 is set to measure a power value of a representative tone in the band of interest 411, and the second marker 402 is set to measure a power value of a representative tone in the notch 412 within the band of interest 411. The power value indicated by the first marker 401 is about −48.93 dBm, the band power of the band of interest 411 is about −28.28 dBm, the power value indicated by the second marker 402 is about −77.31 dBm, and the NPR of the notch 412 is about −66.63 dBm. Making a band power measurement in the notch has limitations similar to making ACLR measurements, and thus limits the capability of making very low NPR measurements.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Traditionally, spectrum analysis is used to determine qualities of the signals being measured, and there are usually no assumptions regarding any characteristics of the signal. That is, spectrum analysis is traditionally a response-only measurement. In network analysis, a stimulus signal is presented to the DUT, as mentioned above, and is usually measured at the input of the DUT and the output of the DUT. Thus, there is assumed some knowledge of the signal (input signal) applied to the DUT. However, according to various embodiments of the present disclosure, network analyzer hardware may be used, where the network analyzer hardware is configured (e.g., in software) to make spectrum analyzer type measurements. By presuming just one aspect of the input signal, i.e., the fact that it is a periodic signal, the quality of power detection can be improved.

Various representative embodiments generally provide a method and system for improving measurements of adjacent channel power levels (ACPLs), adjacent channel power ratios (ACPRs) and noise power ratio (NPR) signal levels based on use of test signals that have repetitive waveforms, as well as improving any other measurement of band power on a repetitive waveform. For example, many amplifier or other nonlinear DUT tests involve a test signal created using a waveform generated by an arbitrary waveform generator (AWG), which has characteristics of the desired test signal, and is necessarily repetitive. One reason test signals with repetitive waveforms are used in manufacturing testing is that each DUT should be tested using the same signal to ensure that only DUT effects are measured. Since the test signal is repetitive in a time domain, Fourier analysis provides that the test signal must comprise multitone sine waves in a frequency domain. The spacing of the multi-tone sine waves is one over the period of the waveform generated by the AWG. For example, when the waveform has a period of one microsecond (μs), the test signal is comprised of multitone sine waves of N*1 MHz, where N is a positive integer. In the case of a band limited test signal, amplitude of each sine wave of the test signal outside the band of interest is set to zero, leaving only signals at the 1 MHz frequency spacings in the band of interest in the illustrative waveform.

Accordingly, because the test signal is known to be repetitive, conventional band power measurements may be discarded, and instead band power may be computed according to various embodiments that enable determination of ACPL, ACPR and NPR with more dynamic range than conventional methods. Thus, linearization measurements of amplifiers, and other nonlinear DUTs, with very low ACPL, ACPR and NPR are possible, enabling improved linearization techniques. The multitone power detection method according to the various embodiments enables one to specify a repetition period, or multitone frequency, of the test signal (e.g., provided by the AWG), and to set a band power detector to selectively measure power at those specified frequencies or to determine the multitone frequency or waveform period from a measurement of the test signal.

Figure 5:
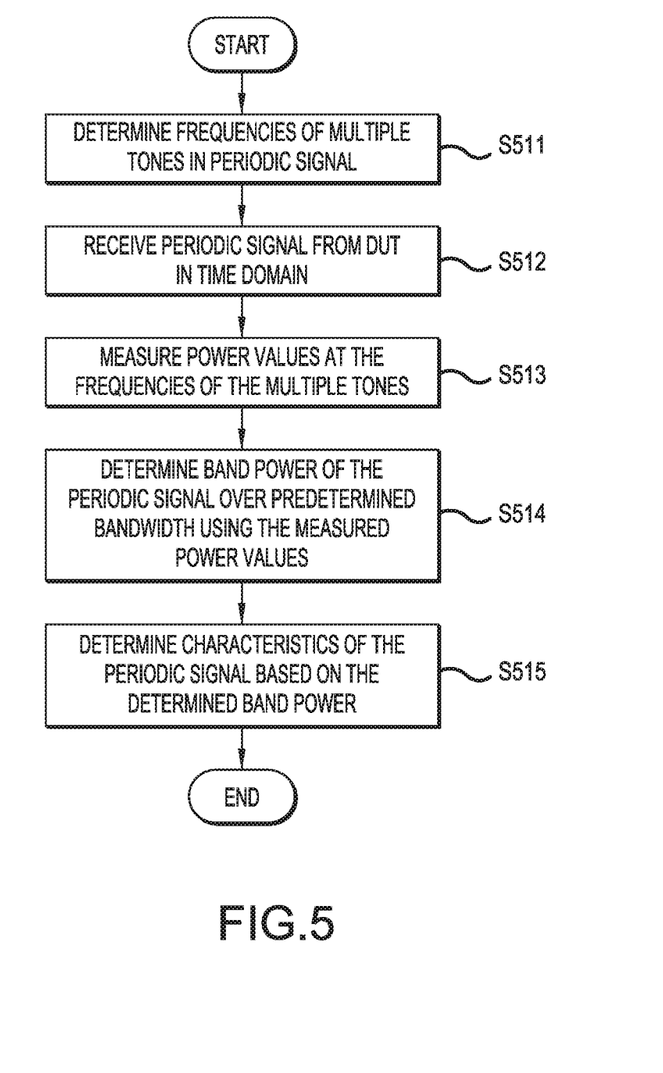
FIG. 5 is a flow diagram showing a method of measuring a complex modulated signal output by DUT, according to a representative embodiment.

FIG. 5 is a flow diagram of a method for detecting power of a periodic signal output by a device under test (DUT) in a predetermined bandwidth, according to a representative embodiment. The method depicted in FIG. 5 may be implemented, at least in part, as an algorithm by a processing unit 732 of a signal analyzer 730, discussed below with reference to FIG. 7, for example.

Referring to FIG. 5, the method for detecting power of a periodic signal in a band of interest having a predetermined bandwidth includes determining the respective frequencies of multiple tones in the periodic signal in block S511. The periodic signal, which may be referred to as a "test signal" or "periodic test signal," for example, may be generated by the DUT itself (e.g., in the case of testing a signal generator). Or, the periodic signal may be an input periodic input to the DUT as a stimulus and/or an output periodic signal output from the DUT (e.g., in the case of testing an amplifier) in response to the input periodic signal. The output periodic signal indicates characteristics of the DUT, such as nonlinearity. Thus, the frequencies of the multiple tones may be determined by analyzing the input periodic signal provided to the DUT, for example, by an AWG, and/or by analyzing the output periodic signal from the DUT, both of which are referred to as the periodic signal.

Determining the frequencies of the multiple tones in the periodic signal may include determining a first frequency of a first tone in the predetermined bandwidth, and then determining a tone spacing indicating a frequency difference between adjacent tones of the multiple tones in the periodic signal. When the periodic signal is generated by an AWG, for example, which has a predetermined repetition time, the tone spacing between adjacent tones may be determined as the reciprocal of the repetition time. Therefore, the frequency of each tone may be determined by adding the tone spacing to the frequency of the immediately preceding tone, until reaching the end of the predetermined bandwidth. Or, stated differently, the frequency of each tone may be determined by adding incrementally increasing multiples of the tone spacing to the first frequency of the first tone, until reaching the end of the predetermined bandwidth. Of course, other methods for determining the frequencies of the multiple tones in the periodic signal may be incorporated, without departing from the scope of the present teachings.

In block S512, the periodic signal is received from the DUT at a signal analyzer, or other measurement instrument, in the time domain. The term signal analyzer may also include, for example, a network analyzer operating as a signal analyzer, or a tuned receiver or a network analyzer operating as a tuned receiver, although other measurement instruments with the requisite capabilities may be incorporated, without departing from the scope of the present teachings. In an embodiment, receiving the periodic signal includes sampling the periodic signal and identifying the sampled signals using digital processing, such as digital filtering, Discrete Fourier transform (DFT) data acquisition or fast Fourier transform (FFT) data acquisition, for example. The digital processing transforms the sampled periodic signal from the time domain to the frequency domain. For example, DFT data acquisition may be performed by the signal analyzer, providing multiple DFT frequency bins or multiple frequencies. Alternatively, FFT data acquisition may be performed by the signal analyzer on the sampled signals, providing multiple FFT frequency bins. Notably, at least some of the multiple tones in the sampled periodic signal may be intermodulation products, produced from intermodulation among tones and/or harmonics of tones in the periodic signal.

In block S513, power values are selectively measured at the frequencies of the multiple tones, and in block S514, band power of the periodic signal is determined over the predetermined bandwidth (band of interest), e.g., by summing the power values selectively measured at the frequencies of the multitones using a processor executing a software program and/or a hardware accumulator or adder, for example. "Selectively measured" and "selectively measuring" mean that only the power values of the multiple tones at the corresponding multiple tone frequencies are measured for use in determining the band power of the periodic signal over the band of interest, while power values at other frequencies (frequencies not corresponding to the multiple tones) are not measured and/or have been set to substantially equal zero. Alternatively, (non-zeroed) power values at other frequencies may be measured, but not used in determining the band power of the periodic signal over the band interest, without departing from the present teachings. Therefore, as a practical matter, only the power values of the multiple tones are summed in block S514 to determine the band power of the band of interest. That is, only the respective power values at the multiple tone frequencies are measured in block S513 and summed in block S514. Or, the power values for the frequencies in the predetermined bandwidth that do not correspond to multitone frequencies are recognized and zeroed out, so that even when the power values from all of the frequencies are measured and summed in blocks S513 and S514, only the multitone frequencies have corresponding, non-zero power values and thus contribute to determining the band power of the band of interest. The band power is therefore the average or accumulated power in the predetermined bandwidth of the band of interest, excluding power occurring at frequencies not corresponding to the periodic tone frequencies. When intermodulation products are present, selectively measuring the power values at the multitone frequencies also includes any additional power value provided by the intermodulation products at those multitone frequencies.

The sampled periodic signal provides a waveform that repeats, where a time length of the waveform is one period. At a minimum, the waveform must include an entire period of the sampled periodic signal, although the waveform may include multiple periods. In this case, data from the sampled periodic signal may be acquired over multiple periods of a waveform, and data in the time domain is averaged before determining the power values of each of the multiple tones using digital filtering, DFT or FFT. Averaging the data (or signal) in the time domain increases the measurement time linearly with the averaging number; in contrast applying an FFT to a longer duration signal will similarly reduce noise, but the processing time will increase as N*Log(N) where N is the acquisition time. Thus averaging in the time domain provides a speed advantage over increasing the FFT length, for the same noise improvement.

In an embodiment, when receiving the periodic signal, measuring the power values only at the frequencies of the multiple tones generally includes identifying signals in the predetermined bandwidth that have corresponding frequencies coinciding with the frequencies of the multiple tones of the sampled periodic signal, as mentioned above. Then, the measured power values of only the identified multitone frequency signals are summed to determine band power of the periodic signal in the predetermined bandwidth.

For example, when receiving the periodic signal includes DFT data acquisition, as mentioned above, measuring the power values only at the frequencies of the multiple tones (which may be referred to as the "multitone frequencies") includes identifying the DFT frequency bins or DFT frequencies that lie on the multitone frequencies. Then, only the power values of the identified DFT frequency bins or DFT frequencies that lie on the multitone frequencies are summed, e.g., by a processing unit and memory in the signal analyzer. For example, the memory may store the power values of all the DFT frequency bins or DFT frequencies, and memory locations storing the power values of the identified DFT frequency bins or DFT frequencies lying on the multitone frequencies may be provided to the processor for the summing operation.

Similarly, measuring the power values only at the frequencies of the multiple tones may include generating an output array that contains each DFT frequency bin or each DFT frequency, where a resolution bandwidth (RBW) of the signal analyzer is set less than a tone spacing of the periodic signal, and making a discrete sum of DFT signals from the DFT frequency bins or DFT frequencies at each of the frequencies of the multiple tones over the predetermined bandwidth. The tone spacing of the periodic signal indicates a frequency difference between adjacent tones of the multiple tones in the periodic signal, as discussed above.

In another embodiment, for each of the DFT frequency bins or DFT frequencies that do not lie on the frequencies of the multiple tones, a value of zero is assigned to the corresponding power value, e.g., stored in memory. That is, when a DFT frequency bin or DFT frequency does not lie on a multitone frequency, a power value of zero is stored in a memory location corresponding to that DFT frequency bin or DFT frequency (e.g., replacing the previously stored actual power value, if one has been obtained). The processing unit may then add all of the stored power values of the DFT frequency bins or DFT frequencies, since the power values not associated with the multitone frequencies will already have been zeroed out. This technique is particularly effective for signal analyzers capable of computing DFT very quickly. As a practical matter, the result is the same in that power values of the DFT frequency bins or the DFT frequencies that lie on the multitone frequencies are selectively measured and summed to provide the band power.

The process is substantially the same with regard to receiving the periodic signal using FFT data acquisition. For example, in an embodiment, measuring the power values only at the frequencies of the multiple tones includes identifying the FFT frequency bins that lie on the frequencies of the multiple tones. Then, only the power values of the identified FFT frequency bins that lie on the multitone frequencies are summed, e.g., by a processing unit and memory in the signal analyzer. Similarly, measuring the power values only at the frequencies of the multiple tones may include generating an output array that contains each FFT frequency bin, where a RBW of the signal analyzer is set less than a tone spacing of the periodic signal, and making a discrete sum of FFT signals from the FFT frequency bins at each of the frequencies of the multiple tones over the predetermined bandwidth. As mentioned above, the tone spacing of the periodic signal indicates a frequency difference between adjacent tones of the multiple tones in the periodic signal.

In another embodiment, selectively measuring the power values at the frequencies of the multiple tones includes identifying FFT frequency bins of the multiple FFT frequency bins that lie on the frequencies of the multiple tones, and assigning power values of zero to the FFT frequency bins that do not lie on the multitone frequencies. Determining the band power of the periodic signal over the predetermined bandwidth is accomplished by summing the power values of all the FFT frequency bins, where only the multiple tones have non-zero values.

In block S515, various characteristics of the periodic signal are determined based on the band power of the predetermined bandwidth determined in block S514. For example, NPR in the predetermined bandwidth may be determined based on the band power of the periodic signal, where the predetermined bandwidth is a notch in a wideband modulated signal from a noise source. Also, at least one of ACPL and ACPR corresponding to at least one channel adjacent to the predetermined bandwidth may be determined based on the band power of the periodic signal. Likewise, carrier power in the predetermined bandwidth may be determined based on the band power of the periodic signal. In some cases, only a single value of power (for example, only ACPL or only carrier power) is desired, in which case only a single band power computation is required.

Figure 6:
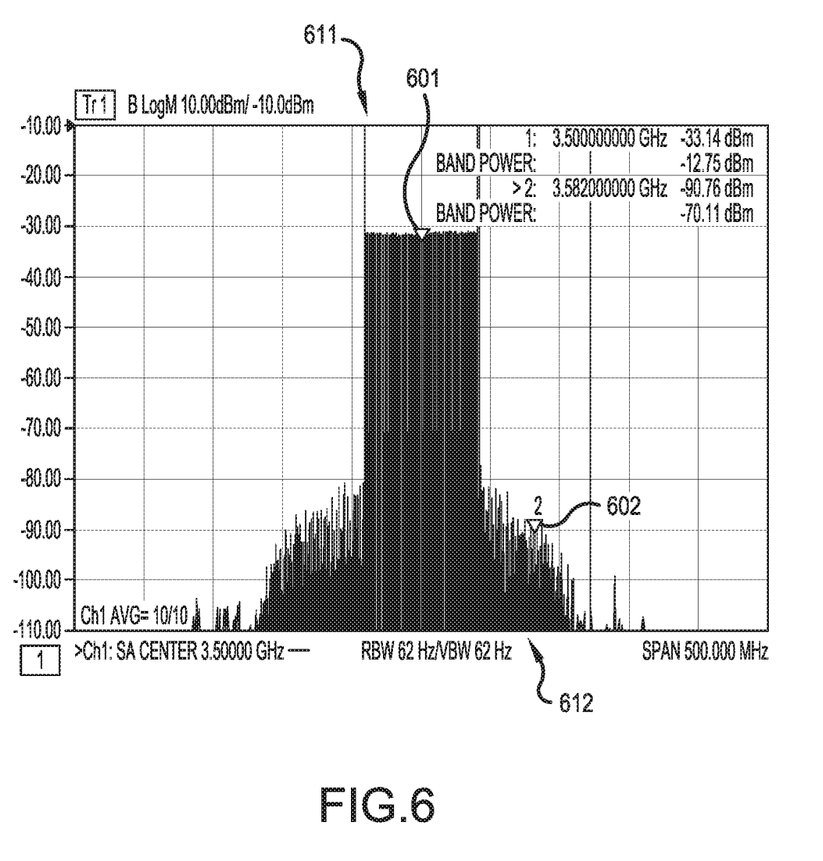
FIG. 6 is a screen shot of a display of a signal analyzer showing an illustrative spectrum of a complex modulated signal output by a DUT in response to an input complex modulated signal, according to a representative embodiment.

FIG. 6 is a screen shot of a display of a signal analyzer showing an illustrative spectrum of a complex modulated signal output by the DUT (e.g., a power amplifier with −20 dBm drive) in response to an input complex modulated signal, according to a representative embodiment. A comparison may be made between FIG. 6 and FIG. 3, which shows a frequency spectrum using a conventional process with −20 dBm drive.

Referring to FIG. 6, the first marker 601 is set to measure a power value of a representative tone in the band of interest 611, and the second marker 602 is set to measure a power value of a representative tone in the upper adjacent band 612 adjacent to the band of interest 611. The power value indicated by the first marker 601 is about −33.14 dBm, and the band power of the band of interest 611 is about −12.75 dBm (both of which are the same as shown in FIG. 3), while the power value indicated by the second marker 602 is about −90.76 dBm, and the ACPL is about −70.11 dBm. This ACPL is much closer to the expected value of the ACPL of −70.53 dBm, and is desirable for low-level linearization measurements of amplifiers. The expected value of the ACPL may be estimated from the band power of FIG. 3, for example, where the DUT is driven at higher power level. The ACPR is about −57.00 dBc, which is about the same as the expected value of the ACPR for a power amplifier with −20 dBm drive.

According to alternative embodiments, NPR in a notch within a band of interest of a sampled periodic signal is determined in by a process related to that described above with regard to determining band power of a sampled periodic signal in a band of interest. That is, the band power of the predetermined bandwidth (excluding the notch) is determined as discussed above with reference to FIG. 5. Then, power values are selectively measured at the frequencies of the multiple tones (such as the representative tone indicated by the second marker 402 in FIG. 4) in the notch (such as notch 412 in FIG. 4), and notch power of the periodic signal in the notch is determined, e.g., by summing the power values selectively measured at the frequencies of the multitones in the notch. That is, the power value at each of the multiple tone frequencies may be measured, as well as the power values at other frequencies within the notch, e.g., using any of the various forms of digital processing. However, only the power values of the multiple tones are summed to obtain the notch power, which is the average or accumulated power in the notch. Alternatively, the power values for the frequencies of the periodic signal in the notch that do not correspond to multitone frequencies are zeroed out (so that only the multitone frequencies have corresponding non-zero power values), and all of the power values in the notch are summed to obtain the notch power. The NPR may then be determined by dividing notch power by the band power.

Figure 7:
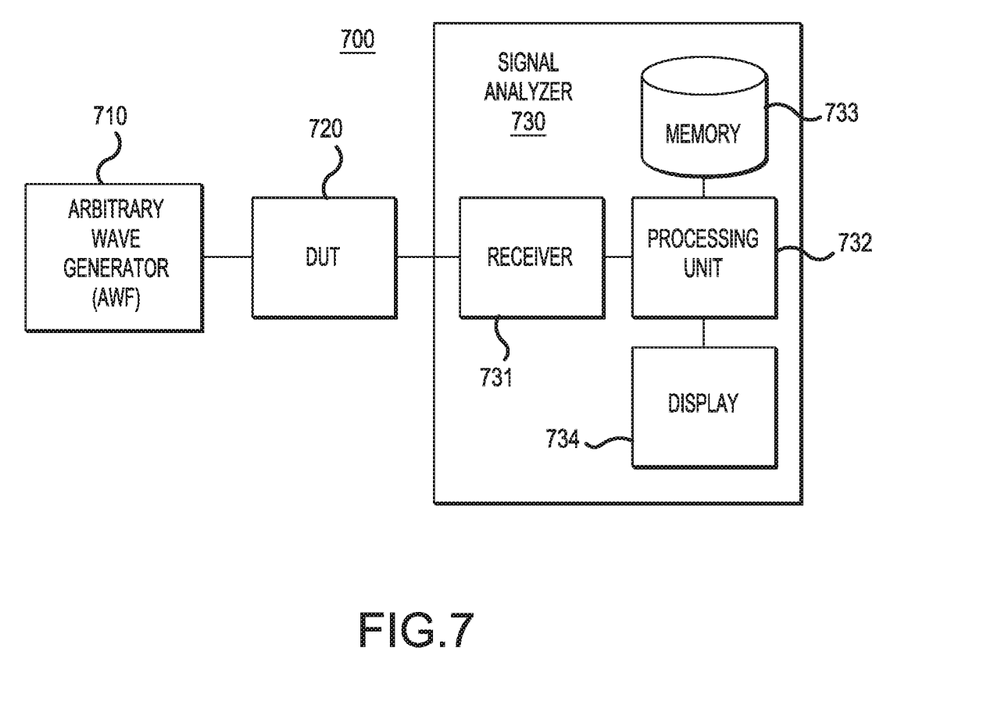
FIG. 7 is a simplified block diagram of a signal analyzer system for measuring a complex modulated signal output by DUT, according to a representative embodiment.

FIG. 7 is a simplified block diagram of a signal analyzer system for measuring a complex modulated signal output by DUT, according to a representative embodiment.

Referring to FIG. 7, signal analyzer system 700 includes a radio frequency (RF) signal generating device, such as arbitrary wave generator (AWG) 710, and a signal analyzer 730. Generally, the AWG 710 generates a periodic signal having a repetitive, complex waveform that is applied to DUT 720, which may be a nonlinear power amplifier, for example. In an embodiment, the DUT 720 may generate the periodic signal itself, for example, when the DUT 720 is a signal generator. In FIG. 7, the DUT 720 outputs a periodic signal, which is received by the signal analyzer 730, in response to the periodic signal input by the AWG 710. The output periodic signal indicates characteristics of the DUT, such as nonlinearity. The signal analyzer 730 may include a receiver 731, a processing unit 732, a memory 733 and a display 734, for example.

The receiver 731 down converts the periodic signal output by the DUT 720 from its carrier frequency to an intermediate frequency (IF), typically through mixing with an internally generated local oscillator (LO) frequency. Depending on the type of modulation, the periodic signal may be further down converted from the IF to base band. The receiver 731 also digitizes the received periodic signal, e.g., using an analog-to-digital converter (ADC), enabling sampling of the periodic signal. The receiver 731 may perform other processing steps, such as signal amplification and filtering, as would be apparent to one skilled in the art, without departing from the present teachings. Also, the receiver 731 may implement digital filtering, DFT data acquisition or FFT data acquisition in order to enable identification of data at various frequencies of the sampled periodic signal, for example.

The processing unit 732, working together with the memory 733, is configured to determine various power characteristics of the sampled periodic signal, including determining band power, ACPL, ACPR, and/or NPR, as discussed above. For example, the processing unit 732 digitally processes the sampled periodic signal, e.g., in the frequency domain, identifying data at various frequencies of the sampled periodic signal. The identified data, such as measured power values, may be stored together with corresponding frequencies or frequency tones in the memory 733. For example, DFT data acquisition by the processing unit 732 provides multiple DFT frequency bins or multiple frequencies associated with the sampled periodic signal, and FFT data acquisition by the processing unit 732 provides multiple FFT frequency bins associated with the sampled periodic signal. The processing unit 732 may also identify the band of interest, and the lower and upper adjacent channel bands, of the sampled signal. This may be accomplished automatically by identifying where the power values at certain frequencies drop significantly, indicating the edges of the band of interest. Alternatively, the lower and upper frequencies defining the band of interest may be entered and/or previously stored in the memory 733.

The processing unit 732 is also configured to determine a band power of the periodic signal over a predetermined bandwidth of the band of interest. Determining the band power may include summing the power values measured at the frequencies of the multitones within the band of interest. According to various embodiments, as discussed above, this may be accomplished by the processing unit 732 adding only those power values of frequencies corresponding to the multitones in the band of interest. The power values at frequencies other than the multitone frequencies and not summed, e.g., by skipping or otherwise discarding these power values.

The power values of the frequencies corresponding to the multitones in the band of interest may be summed upon determination by the processing unit 732, or the processing unit 732 may read these power values from the memory 733, for example. Alternatively, the processing unit 732 may identify in the memory 733 the frequencies corresponding to the tones in the band of interest, and then set the power values of all other frequencies within the band of interest to zero in the memory 733. The processing unit 732 may then sum the power values of all of the multitone frequencies in the band of interest to obtain the band power, since any frequency not associated with a multitone has a power value of zero and will therefore have no effect on the resulting band power.

As mentioned above, when intermodulation products are present, determining the band power includes any additional power value provided by the intermodulation products at the frequencies associated with the multitones in the band of interest. Also, when a waveform of the sampled periodic signal has multiple periods, the processing unit 732 may acquire data from the sampled periodic signal over the multiple periods, and average the data in the time domain before determining the power values of each of the multiple tones using digital filtering, DFT or FFT, and thus before determining the band power of the band of interest.

The display 734 is configured to display at least the frequency spectrum of the sampled periodic signal throughout all or part of the processing. The display 734 may be any display device compatible with digital signal processing and display of frequency spectrums, including for example a liquid crystal display (LCD), a light emitting diode (LED) display, an organic light emitting diode (OLED), a flat panel display, a solid-state display, or a cathode ray tube (CRT). Additionally, the signal analyzer 730 may include an input device (not shown), such as a keyboard/virtual keyboard or touch-sensitive input screen or speech input with speech recognition, and a cursor control device, such as a mouse or touch-sensitive input screen or pad.

The processing unit 732 is shown included in the signal analyzer 730, however, all of part of the processing unit 732 may be incorporated in a separate device, such as a personal computer (PC) or a dedicated workstation. Generally, the processing unit 732 may be implemented by a computer processor, application specific integrated circuits (ASICs), field-programmable gate arrays (FPGAs), or combinations thereof, using software, firmware, hard-wired logic circuits, or combinations thereof. A computer processor, in particular, may be constructed of any combination of hardware, firmware or software architectures, and may include memory (e.g., volatile and/or nonvolatile memory) for storing executable software/firmware executable code that allows it to perform the various functions. In an embodiment, the computer processor may comprise a central processing unit (CPU), a graphics processing unit (GPU), or both, for example, executing an operating system. The processing unit 732 may include a storage device or memory, such as random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

Data from various measurements and characterizations of the periodic signal may be displayed and/or stored for analysis, for example. A user interface, such as a graphical user interface (GUI) (not shown), may be included with the processing unit 732 for a user to control operations and/or view data and computation results of the signal analyzer system 700.

The processing unit 732 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component, and may be a general-purpose processor or may be part of an ASIC. A processor may also be a microprocessor, a microcomputer, a processor chip, a controller, a microcontroller, a digital signal processor (DSP), a state machine, or a programmable logic device. A processor may also be a logical circuit, including a programmable gate array (PGA) such as an FPGA, or another type of circuit that includes discrete gate and/or transistor logic. Additionally, any processor described herein may include multiple processors, parallel processors, or both. Multiple processors may be included in, or coupled to, a single device or multiple devices.

As mentioned above, the signal analyzer 730 includes a memory 733, which may be internal to the signal analyzer 730, external to the signal analyzer 730, or a combination of both. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component, and may be referred to as a computer-readable medium from which data and executable instructions can be read by a computer or processor. As mentioned above, memories described herein may be RAM, ROM, flash memory, EPROM, EEPROM, registers, a hard disk, a removable disk, tape, CD-ROM, DVD, floppy disk, blu-ray disk, or any other form of storage medium known in the art. Memories may be volatile or non-volatile, secure and/or encrypted, unsecure and/or unencrypted.

In a particular embodiment, the memory 733 may include a computer-readable medium in which one or more sets of instructions, e.g. software, can be embedded. Sets of instructions can be read from the computer-readable medium. Further, the instructions, when executed by a processor (e.g., processing unit 732), can be used to perform one or more of the methods and processes as described herein. In various embodiments, the instructions may reside completely, or at least partially, within the memory 733 and/or the processing unit 732 during execution by the signal analyzer 730.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. A method of detecting power of a periodic signal in a band of interest of the periodic signal having a predetermined bandwidth, the method comprising:
    determining frequencies of multiple tones in the periodic signal, respectively, the multiple tones being within the predetermined bandwidth;
    receiving the periodic signal at a signal analyzer in a time domain, and transforming the periodic signal including the multiple tones to a frequency domain;
    selectively measuring power values at the frequencies of the multiple tones in the periodic signal in the frequency domain; and
    determining a band power of the periodic signal over the predetermined bandwidth by summing only the power values selectively measured at the frequencies of the multiple tones, excluding power values at frequencies not corresponding to the frequencies of the multiple tones.

2. The method of claim 1, wherein receiving the periodic signal comprises sampling the periodic signal in the time domain.

3. The method of claim 2, wherein selectively measuring the power values at the frequencies of the multiple tones further comprises:
acquiring data from the sampled periodic signal in the time domain over multiple periods of a waveform of the sampled periodic signal, and
averaging the acquired data in the time domain before transforming the sampled periodic signal to the frequency domain.

4. The method of claim 2, wherein transforming the periodic signal to the frequency domain comprises performing a fast Discrete Fourier transform (DFT) data acquisition of the sampled periodic signal by the signal analyzer to provide a plurality of DFT frequency bins or a plurality of DFT frequencies.

5. The method of claim 4, wherein selectively measuring the power values at the frequencies of the multiple tones further comprises identifying DFT frequency bins or DFT frequencies that lie on the frequencies of the multiple tones, and measuring only the power values at the identified DFT frequency bins or DFT frequencies, and
wherein determining the band power of the periodic signal over the predetermined bandwidth comprises summing the measured power values at the identified DFT frequency bins or the DFT frequencies.

6. The method of claim 4, wherein selectively measuring the power values at the frequencies of the multiple tones further comprises identifying DFT frequency bins or DFT frequencies that do not lie on the frequencies of the multiple tones, setting power values to zero for the identified DFT frequency bins or DFT frequencies that do not lie on the frequencies of the multiple tones, and measuring the power values at the plurality of DFT frequency bins or the DFT frequencies, and
wherein determining the band power of the periodic signal over the predetermined bandwidth comprises summing the measured power values at the plurality of DFT frequency bins or the DFT frequencies.

7. The method of claim 4, wherein selectively measuring the power values at the frequencies of the multiple tones comprises:
generating an output array that contains each DFT frequency bin or each DFT frequency, wherein a resolution bandwidth (RBW) of the signal analyzer is set less than a tone spacing of the periodic signal, the tone spacing indicating a frequency difference between adjacent tones of the multiple tones in the periodic signal,
identifying DFT frequency bins or DFT frequencies in the output array that lie on the frequencies of the multiple tones; and
making a discrete sum of DFT signals from the identified DFT frequency bins or DFT frequencies at each of the frequencies of the multiple tones over the predetermined bandwidth.

8. The method of claim 2, wherein transforming the periodic signal to the frequency domain comprises performing a fast Fourier transform (FFT) data acquisition of the sampled periodic signal by the signal analyzer to provide a plurality of FFT frequency bins.

9. The method of claim 8, wherein selectively measuring the power values at the frequencies of the multiple tones further comprises identifying FFT frequency bins, of the plurality of FFT frequency bins, that lie on the frequencies of the multiple tones, and measuring only the power values at the identified FFT frequency bins, and
wherein determining the band power of the periodic signal over the predetermined bandwidth comprises summing the measured power values at the identified FFT frequency bins.

10. The method of claim 8, wherein selectively measuring the power values at the frequencies of the multiple tones further comprises identifying FFT frequency bins that do not lie on the frequencies of the multiple tones, setting powers to zero for the identified FFT frequency bins that do not lie on the frequencies of the multiple tones, and measuring the power values of the plurality of FFT frequency bins, and
wherein determining the band power of the periodic signal over the predetermined bandwidth comprises summing the measured power values at the plurality of FFT frequency bins.

11. The method of claim 8, wherein selectively measuring the power values at the frequencies of the multiple tones comprises:
generating an output array that contains each FFT frequency bin of the plurality of FFT frequency bins, wherein a resolution bandwidth (RBW) of the signal analyzer is set less than a tone spacing of the periodic signal, the tone spacing indicating a frequency difference between adjacent tones of the multiple tones in the periodic signal; and
identifying FFT frequency bins in the output array that lie on the frequencies of the multiple tones; and
making a discrete sum of FFT signals from the identified FFT frequency bins at each of the frequencies of the multiple tones over the predetermined bandwidth.

12. The method of claim 1, wherein determining the frequencies of the multiple tones in the periodic signal comprises determining a first frequency of a first tone in the predetermined bandwidth, and determining a tone spacing indicating a frequency difference between adjacent tones of the multiple tones in the periodic signal.

13. The method of claim 1, wherein at least some of the multiple tones in the periodic signal comprise intermodulation products, produced from other multiple tones and/or harmonics of other multiple tones in the periodic signal, and
wherein selectively measuring the power values at the frequencies of the multiple tones includes power values added by the intermodulation products.

14. The method of claim 1, wherein the periodic signal is generated by an arbitrary waveform generator (AWG) having a predetermined repetition time, and
wherein determining the frequencies of the multiple tones in the periodic signal comprises determining a tone spacing of the multiple tones as a reciprocal of the repetition time.

15. The method of claim 1, further comprising:
determining noise power ratio (NPR) in the predetermined bandwidth based on the band power of the periodic signal, wherein the predetermined bandwidth is a notch in a wideband modulated signal from a noise source.

16. The method of claim 1, further comprising:
determining at least one of adjacent channel power level (ACPL) and adjacent channel power ratio (ACPR) corresponding to at least one channel adjacent to the predetermined bandwidth based on the band power of the periodic signal.

17. A signal analyzing device, comprising:

a receiver for receiving a periodic signal from a device under test (DUT) in a time domain, the periodic signal including a band of interest having a predetermined bandwidth; and a processing unit configured to execute instructions, stored in a non-transitory memory, wherein executing the instructions causes the processing unit to determine frequencies of multiple tones in the predetermined bandwidth of the periodic signal, respectively, to transform the periodic signal to a frequency domain, to selectively measure power values at the determined frequencies of the multiple tones of the periodic signal in the frequency domain, respectively, and to sum only the selectively measured power values at the determined frequencies of the multiple tones, excluding power values at frequencies not corresponding to the frequencies of the multiple tones, to determine a band power over the predetermined bandwidth of the periodic signal.

18. The device of claim 17, wherein the receiver comprises an analog-to-digital converter (ADC) for sampling the periodic signal.

19. The device of claim 18, wherein transforming the periodic signal to the frequency domain comprises performing one of a Discrete Fourier transform (DFT) data acquisition or a fast Fourier transform (FFT) of the sampled periodic signal by the processing unit to provide a plurality of DFT frequency bins or a plurality of DFT frequencies or to provide a plurality of FFT frequency bins, respectively.

20. A signal analyzing device, comprising:

a receiver for receiving a periodic signal from a device under test (DUT) in a time domain, the periodic signal having a repeating waveform and including a band of interest having a predetermined bandwidth;

an analog-to-digital converter (ADC) for sampling the periodic signal; and a processing unit configured to execute instructions, stored in a non-transitory memory, wherein executing the instructions causes the processing unit to:

acquire data from the sampled periodic signal in the time domain over multiple periods of the repeating waveform of the periodic signal;

average the acquired data in the time domain;

transform the periodic signal with the averaged data to a frequency domain;

selectively measure power values at frequencies of multiple tones of the periodic signal in the frequency domain, respectively; and sum only the selectively measured power values at the frequencies of the multiple tones, excluding power values at frequencies not corresponding to the frequencies of the multiple tones, to determine a band power over the predetermined bandwidth of the periodic signal.

* * * * *